United States Patent
Woelke et al.

(10) Patent No.: US 11,794,372 B2
(45) Date of Patent: Oct. 24, 2023

(54) METHOD FOR INSERTING A NAIL INTO AT LEAST ONE COMPONENT PART

(71) Applicant: Robert Bosch GmbH, Stuttgart (DE)

(72) Inventors: Florian Woelke, Leonberg (DE); Andre Philipskoetter, Ahaus/Wuellen (DE); Reiner Ramsayer, Rutesheim (DE)

(73) Assignee: Robert Bosch GmbH, Stuttgart (DE)

(*) Notice: Subject to any disclaimer, the term of this patent is extended or adjusted under 35 U.S.C. 154(b) by 223 days.

(21) Appl. No.: 17/100,403

(22) Filed: Nov. 20, 2020

(65) Prior Publication Data
US 2021/0154882 A1    May 27, 2021

(30) Foreign Application Priority Data

Nov. 27, 2019 (DE) .................... 10 2019 218 335.2

(51) Int. Cl.
| | |
|---|---|
| *B27F 7/05* | (2006.01) |
| *B29C 65/56* | (2006.01) |
| *B29C 65/00* | (2006.01) |
| *B21J 15/16* | (2006.01) |

(52) U.S. Cl.
CPC ............ *B27F 7/05* (2013.01); *B21J 15/16* (2013.01); *B29C 65/562* (2013.01); *B29C 66/824* (2013.01)

(58) Field of Classification Search
CPC ...... B27F 7/05; B27F 7/15; B21J 15/16; B21J 15/025; B29C 66/824
USPC ..................... 227/129; 29/524.1, 509, 407.08
See application file for complete search history.

(56) References Cited

U.S. PATENT DOCUMENTS

| | | | | |
|---|---|---|---|---|
| 2,994,243 A | * | 8/1961 | Langstroth | F16B 19/1081 29/512 |
| 3,224,086 A | * | 12/1965 | Balamuth | B29C 66/8221 29/525 |
| 3,477,336 A | * | 11/1969 | Thorpe | F16B 19/1054 411/29 |
| 3,990,343 A | * | 11/1976 | Francois | F16B 19/10 411/29 |
| 4,629,380 A | * | 12/1986 | Gunkel | F16B 19/083 411/29 |
| 4,920,833 A | * | 5/1990 | Rosenthal | B25B 27/0014 411/40 |
| 8,375,549 B2 | * | 2/2013 | Draht | F16B 19/14 29/818 |

(Continued)

FOREIGN PATENT DOCUMENTS

| | | |
|---|---|---|
| DE | 10 2010 006 404 A1 | 8/2011 |
| DE | 10 2018 220 897 A1 | 6/2019 |

(Continued)

*Primary Examiner* — Robert F Long
*Assistant Examiner* — Xavier A Madison
(74) *Attorney, Agent, or Firm* — Maginot, Moore & Beck LLP (57) ABSTRACT

A method is disclosed for inserting a nail into at least one component part, the nail having a nail head, a nail shank and a nail tip. The method includes (i) arranging the at least one component part, (ii) positioning the nail, and (iii) driving-in the nail. A force is applied to the nail in the direction of the component part, such that it is pressed into the at least one component part. In addition to the application of force, vibrations are coupled into the nail, and a multipart nail is used.

17 Claims, 5 Drawing Sheets

(56) References Cited

U.S. PATENT DOCUMENTS

| | | | |
|---|---|---|---|
| 8,490,275 B2* | 7/2013 | Kott ..................... | B21J 15/12 |
| | | | 29/524.1 |
| 8,496,419 B2* | 7/2013 | Frank .................. | F16B 19/086 |
| | | | 29/524.1 |
| 8,782,899 B2* | 7/2014 | Draht .................... | F16B 15/06 |
| | | | 156/92 |
| 2008/0222873 A1* | 9/2008 | Draht .................... | F16B 19/14 |
| | | | 29/432 |
| 2013/0139370 A1* | 6/2013 | Bloecher ............ | B21D 39/031 |
| | | | 29/407.08 |

FOREIGN PATENT DOCUMENTS

| | | |
|---|---|---|
| GN | 206092638 U | 4/2017 |
| WO | 80/02185 A1 | 10/1980 |

* cited by examiner

METHOD FOR INSERTING A NAIL INTO AT LEAST ONE COMPONENT PART

This application claims priority under 35 U.S.C. § 119 to patent application no. DE 10 2019 218 335.2, filed on Nov. 27, 2019 in Germany, the disclosure of which is incorporated herein by reference in its entirety.

The present disclosure relates to a method and to a component-part arrangement for inserting a nail into at least one component part.

BACKGROUND

Nailing methods are used to insert a nail into at least one component part. A nailing method is characterized, for example, in that it is not necessary to pre-punch the at least one component part. The nailing technique, or the pressing-in or insertion of nails into at least one component part, is particularly suitable for component parts that are difficult to access, in particular those that are only accessible from one side. When the nail is pressed-in, the nail, usually driven by a mass, or a ram, accelerated by a discharge of compressed air, strikes the at least one component part in a pulsed manner, as a single impulse, at high speed and penetrates it with its shank. The very high speeds and the inertia of the component part result in minor component-part deformations as the nail is being driven in. At the same time, in particular in the case of higher-strength or high-strength steel materials, a non-positive connection is achieved due to the compaction and compression of the material, or of the at least one component part.

DE 10 2010 006 404 A1 describes a method for producing a nail connection between at least two non-prepunched component parts in a joining region by means of a nail inserted into the component parts, in a substantially rotation-free manner, by a setting device. The nail is pressed-in in two steps in that, in a first step of the method, it is only partially driven into the component parts with an abrupt movement at high speed in the joining region, and in a second step of the method it is driven fully into the component parts, to an end position.

In such methods for pressing or inserting nails into a component part, the high joining forces require the component part to be of a very stiff design in order to avoid unwanted and permanent deformation of at least one component part. A stiff design allows the joining forces to be absorbed without excessive deformation. In addition, such methods are only applicable for sheets that have closed profiles and/or for sheet-profile joints, since the nail has to be inserted into dead spaces in the closed profiles.

SUMMARY

According to the disclosure, a method and a component-part arrangement are proposed for inserting a nail into at least one component part, having the features described herein. Advantageous designs are provided by the following description.

The disclosure is based on a method for inserting, or pressing, a nail into at least one component part, comprising a nail head, a nail tip and a nail shank, consisting of the steps (i) arranging the at least one component part, (ii) positioning the nail, and (iii) driving-in the nail, a force being applied to the nail in the direction of the component part, such that it is pressed into the at least one component part. According to the disclosure, it is now provided that, in addition to the application of force, vibrations are coupled into the nail, and a multipart nail is used.

By coupling into the nail vibrations in the form of multiple impulses, the force applied to the nail in the direction of the component part is reduced. The nail is driven through the component part with fine movements instead of with a continuously increasing force. This allows the nail to be pressed into the at least one component part with reduced joining forces on the nail in the direction of joining, the process forces can be considerably reduced and, as a significant secondary effect, there is an associated reduction of noise emission. High noise emissions caused by the hitherto usual setting process with a single impulse (impact of the nail on the component part with sound pressure levels sometimes exceeding 105 dB(A)) can be avoided, or at least reduced. Correspondingly, the associated sound insulation measures sometimes required for a complete installation (i.e. enclosure of the installation equipment) are no longer necessary, or at least remain necessary only to a reduced extent. Moreover, complex design of the joints, or of the component parts, in order to avoid component-part deformations is no longer necessary, or is necessary only to a lesser extent, this being due, in particular, to the reduced force, or joining force, caused by the coupling-in of vibration. A multipart nail has the advantage that unnecessary nail protrusions can be avoided in that the nail can be adapted to the profile thickness of the component part, or to the thickness of the joint of a plurality of component parts having a closed profile, or that simple component parts without a profile can be joined without leaving a nail protrusion. Due to the multipart nature of the nail, the areas of application of the method can also be extended to open profile structures. The multipart nail can have a positive effect on the joint zone, as cracking and unwanted deformation can be reduced, depending on the nail geometry.

It should be noted that, although in principle a nail can also be inserted into only one component part in this way, it is particularly preferred insert a nail into two or more component parts in order to join them together.

The proposed method still offers the advantages of the traditional nailing technique, i.e. it allows, for example, joining without pre-punching in the case of (only) single-side accessibility. The method is also particularly suitable for joining high-strength materials such as steels and fiber composites. It is also suitable for use for mixed, multi-layer and hybrid joints. It can also be used in combination with a bonding technique, i.e. two or possibly more component parts are bonded together and additionally connected, or fixed, with nails. Often the nails then are used only for temporary fixing while the adhesive bond hardens.

According to a preferred design, the vibrations are generated as ultrasonic vibrations, in particular by an ultrasonic generator. This is a simple method of generating vibrations. Ultrasonic generators produce frequencies that are above the range of hearing of the human ear. For the nailing technique, vibrations having a frequency of between 10 kHz and 100 kHz, preferably between 15 kHz and 50 kHz, are expedient. For this purpose it is possible to use an ultrasonic generator that—in the sense of a function generator—is connected to an (electro-mechanical) vibration converter (e.g. piezo-converter) of a vibration system. A vibration system typically has a vibration converter, a sonotrode and possibly a booster (amplitude amplifier), is easily provided and is also sufficient to reduce the force required to push-in the rivet.

If the vibrations are coupled into the nail in a longitudinal direction (i.e. with vibration in the direction of joining), the press-in force in the direction of joining is increased. Owing to the fact that the vibrations are coupled into the nail and/or at least the one component part substantially parallel to the joining direction of the nail, the overall push-in or press-in forces required for the nail are lower.

It is also particularly preferred if the nail is pushed by hammering into the at least one component part by means of a tool that is made to vibrate, such as, for example, the aforementioned vibration system, or a part of it, for example the sonotrode or a punch arranged in front of the sonotrode. Pushing-in by hammering in this case is to be understood to mean pushing-in by means of a very high number (for example several thousand within a short time period, such as one second) of strokes, or multiple impulses, of the tool upon the nail. For this purpose, the frequency of the vibration may be appropriately adapted to a typical natural frequency of the system.

Since the nail has a plurality of mutually engaging functional portions, it can be adjusted in any manner to the thickness of the component part, or to the thickness of the joint of a plurality of component parts. The functional portions are determined by the thickness of the joint zone and perform their function that is matched precisely to the joint zone. By varying the number and function of the portions, the nail can be used for different component parts and different areas of application. Depending on the application, the functional portions may be made of the same material. It is also conceivable for the functional portions to be made of a material suitable for the function of the portion.

According to a particularly advantageous design, the functional portions engage separably in each other by means of a positive and/or non-positive plug-in connection. Separable plug connections have the advantage that the connection can be undone again without damaging the functional portions. The joining of the functional portions thus enables the nail to be easily adapted to the current area of application, or to the component part(s) to be joined. The functional portions engage particularly easily in each other by positive connection. A non-positive plug-in connection prevents the functional portions from shifting as long as the counter-force caused by static friction is not exceeded. A non-positive plug connection is easily realized, for example, by use of magnetized functional portions. Following mutual engagement the functional portions, they are attracted by the magnetic effect and are in full bearing contact with each other. This also facilitates the connection of the functional portions. It is also conceivable that the functional portions adhere to each other by means of adhesive. Different techniques for joining of the functional portions are particularly advantageous depending on the function. Thus, the fastening functional portion may be inseparably connected to the lengthening functional portion or, in the case of a plurality of lengthening functional portions, they may be inseparably connected to each other, and only the last lengthening functional portion may be separably connected to the punching tool. The fastening functional portion can also be separably or inseparably connected directly to the punching tool.

Advantageously, the plug-in connection has a male part, having outwardly facing contact geometry, and a female part, having an inwardly facing contact opening. The contact geometry of the plug-in connection can thus assume any mutually fitting shape. For example, the contact geometry may be cylindrical, rhombic, polygonal, star-shaped or keyhole-shaped.

If the functional portion is a fastening functional portion, in particular a part of the nail shank, it acts as a holding portion in a draw-through region of a component part, or in the joint zone of a plurality of component parts. Depending on the application and/or the material to be joined, the fastening functional portion may be made of a different material. It is also possible, however, to produce all functional portions from the same material, or to produce the respective functional portions from a particularly suitable material according to the function.

If the functional portion is a lengthening functional portion, in particular a part of the nail shank, it acts as an additional holding element to effect a lengthening of the nail shank together with a first functional portion. In particular, the lengthening functional portion may serve to lengthen the holding portion. The nail length can thus be adapted to the thickness of the joint. Depending on the application and/or the material to be joined, the lengthening functional portion can be made of a different material. It is also possible, however, to produce all functional portions from the same material, or to produce the respective functional portions from a particularly suitable material according to the function.

If the functional portion is a punching tool, in particular having a nail tip, it forms the functional portion of the nail that punches the component part. The punching tool may be designed differently depending on the component part(s) and the particular application. Depending on the particular application, the punching tool may be, for example, pointed or flat-topped, and/or the difference in diameter relative to the nail shank may vary, and/or the punching tool may be made of a material specifically required for the application.

The nail may thus also be designed differently depending on the application, by ending as a punching tool, after one or more lengthening functional portions, with the functional portion suitable for the application.

It is particularly advantageous that the punching tool can be detached following the punching operation. This means that, following the punching operation, there is no disrupting nail tip on the component part. The nail can thus also be used for joining simple component parts such as, for example, thin sheets or in the case of component parts without a profile structure. The scope of application is thus expanded considerably by the nailing method according to the disclosure, since the nail can now be used in applications where the nail must not protrude over the component part following the punching operation, or must end in a dead space (e.g. in closed profiles or closed cast structures). The conventional nailing method is limited to component parts with a profile structure, or such material that the nail tip ends in the component part or in a dead space. Due to the punching tool, the nailing method according to the disclosure can be separated off as a separate functional portion, and does not disrupt as a tip protruding from the component part. Thus the protrusion length is shortened to a minimum. Separating-off may be effected in different ways according to the particular application. For example, the punching tool may just be removed in a particularly simple manner, or it may drop off after the punching operation, for example triggered by a certain exposure time of the ultrasonic vibrations or the punching operation as such. The punching tool may be attached and/or glued to a functional portion in a positive and/or non-positive manner, but can be separated off following the punching operation.

If the punching tool is reusable, it can be used multiple times as a punching tool. This advantageously results in savings of material and cost, as fewer punching tools are required. The punching tool may then be made of a high-strength material according to the multiple use, whereas the functional portions may be designed only for a single use.

For example, while the functional portions remain the same, the punching tool may vary according to the particular application and be reused for the respective application.

Advantageously, the punching tool is slotted on the side away from the nail shank. At the end of a joining process, the nail can then spread as a result of the ultrasonic vibration and thus increase the pressing-out force of the nail. Typically, at least one slot is made in the nail tip. Advantageously, the nail having a slotted punching tool can also be used for process monitoring, since the vibration behavior of the nail changes considerably in the course of the process, and in particular during the punching operation, due to the free ends. This change can then be detected, for example, in the vibration behavior and/or in the sound emission and can be used for process control.

Since the nail shank is provided with a surface structure that anchors itself in the component part when the nail is inserted therein, there is a larger contact surface between the nail and the component part, and thus a greater pressing-out, or holding, force. During the operation of pressing-in the nail, the displaced material of the component part penetrates into the surface structure the and grips the nail shank. The holding force is therefore greater than in the case of a conventional nail without a surface structure. The surface structure may have a waved, edged or barbed profile. Depending on the application, the surface structure will be waved if the nail is intended slide particularly easily into the component part. The surface structure will be more edged if it is intended to form a thread, for example, such that the nail can be unscrewed from the component part. However, the surface structure will be more barbed if the nail is to be prevented from being pulled out.

The disclosure furthermore provides a component-part arrangement composed of at least 2 component parts, which are connected by a nail that has been driven-in by the previously described method.

The proposed method as well as the proposed component-part arrangement, i.e. the novel combination of ultrasonic superposition and a nail according to the disclosure, are, as already mentioned, preferably expedient for mixed body-work construction, since in that case a wide variety of materials have to be joined together, where often the joints or joining flanges can be accessed only on one side. With this method, or device, it is conceivable to substitute flow-drilling screws and/or the conventional insertion of nails by the process-related and economic advantages.

A further area of application, besides the automotive industry, is rail vehicle construction and transport. Furthermore, the construction of gondolas and cable cars is a possible area of application. Here, the proposed method, or the proposed device, can replace current blind-rivet joints. The pre-punching required for blind riveting is no longer necessary, such that the process costs can be reduced.

Further advantages and designs of the disclosure are given by the description of the figures and by the appended drawings.

The disclosure is represented schematically in the following drawings on the basis of exemplary embodiments, and is described in detail below with reference to the drawings.

DETAILED DESCRIPTION

Figure 1:
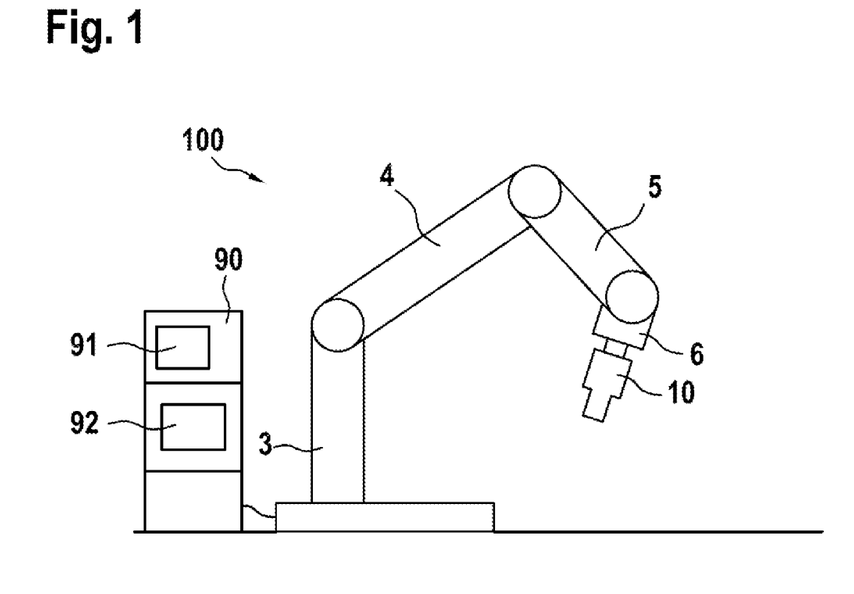
FIG. 1 shows schematically a device according to the disclosure, in a preferred embodiment.

Represented in a simplified and schematic manner in FIG. 1 is a device 100 for inserting a nail into at least one component part in a preferred embodiment, by means of which a method according to the disclosure can also be executed. The device 100 is, for example, an industrial robot or a production means, for example for use in automotive body construction.

The device 100 in this case has a support structure 3 arranged on a floor, and arranged thereon three interconnected and movable arm elements, or components, 4, 5 and 6 arranged thereon, which together form a motor-driven movable robot arm. Arranged at the end of the arm 6 there is a setting unit 10 such as that shown in greater detail, for example, in FIG. 2, and which is only roughly indicated here.

Furthermore, a switchgear cabinet 90 is provided, which accommodates an open-loop and closed-loop control unit 91, as well as a vibration generator 92 realized as an ultrasonic generator. While the open-loop and closed-loop control unit 91 is used to control both the robot arm and the setting unit 10, the ultrasonic generator 92 may be connected to a vibration converter of the setting unit 10, as explained in greater detail later in relation to FIG. 2.

Figure 2:
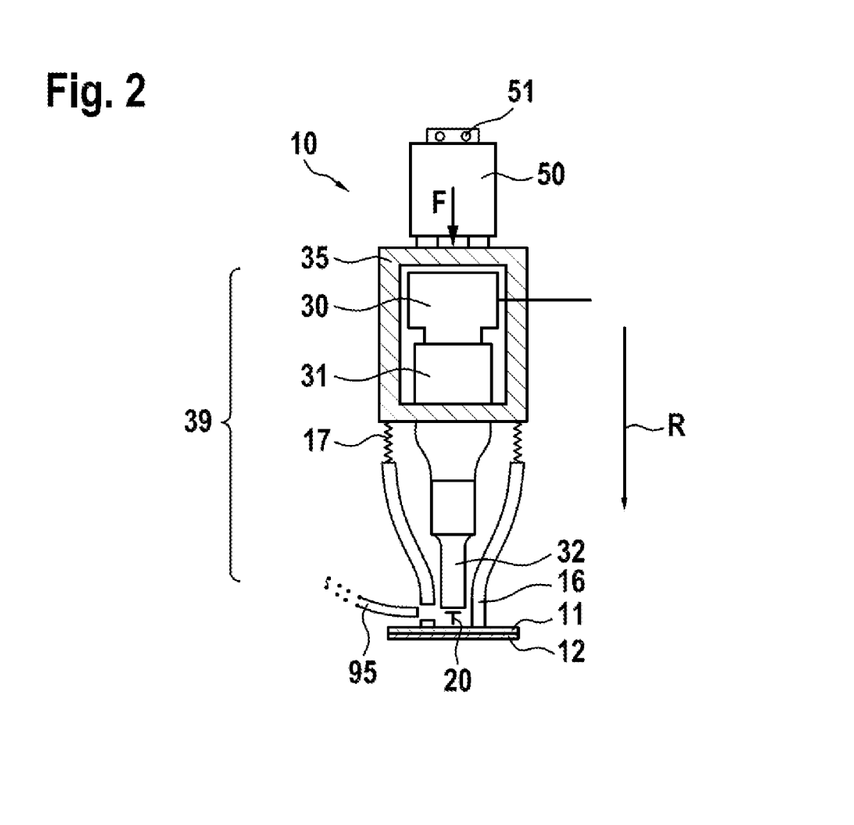
FIG. 2 shows schematically a part of a device according to the disclosure, in a preferred embodiment.

Shown schematically in FIG. 2 is a part of a device according to the disclosure in a preferred embodiment, namely, in particular the setting unit 10 from FIG. 1. The setting unit 10 has a vibration system 39, which in this case has an electro-mechanical vibration converter 30, for example a piezo converter, a so-called booster 31 (also called amplitude amplifier), as well as a tool for pressing-in, in the form of a sonotrode 32.

The vibration converter 30 in this case is interfaced, or connected, or can be interfaced to the electric vibration generator 92 as shown in FIG. 1. In this way, the vibration system 39 can be set into vibration. The vibration system 39 is held, in this case via the booster 31, in a housing unit 35. This housing unit 35 in turn is connected to a drive 50, such that the vibration system 39 is interfaced to the drive 50 in such a manner that a force F, as well as an advance movement, can be transmitted to the vibration system 39, specifically in a joining direction R. Provided on the drive 50, which here is shown only in rough schematic form, there is a flange 51, by means of which the drive 50 can be attached, for example, to the robot arm, or arm link 6, as shown in FIG. 1.

Furthermore, attached to the housing unit 35 by means of spring elements 17 there is a holder 16, which for example surrounds part of the vibration system 39 and can hold and guide a nail 20. By means of a feeder 95, such a nail 20 can be automatically inserted into the holder 16, for example, such that it is placed in front of the sonotrode 32.

Also shown are two component parts 11, 12, such as can be connected, for example, by means of the nail 20 and by use of the device 100, or the setting unit 10. For this purpose, the setting unit can be moved, by means of the robot arm, into the position shown in FIG. 2, in which the holder 16 is in contact with component part 11—the holder 16 in this case also serving as a hold-down device in this sense—and the nail 20 is held in suitable alignment in relation to the component parts 11, 12.

In order then to insert the nail 20 into the component parts 11, 12 and thus connect the component parts to each other, the vibration system 39 is set into vibration by means of the vibration generator 92, and by means of the drive 50 is moved towards the nail 20 in the joining direction R, and thus brought into contact with it. The nail 20 can thus be pressed into the component parts by a further advance movement that is controlled by open-loop or closed-loop control and generated by the drive 50.

Due to the vibrations that are transmitted from the vibration system 39 to the nail 20, and possibly beyond to the component parts 11, 12, the force required to press the nail into the component parts is significantly reduced.

Figure 3:
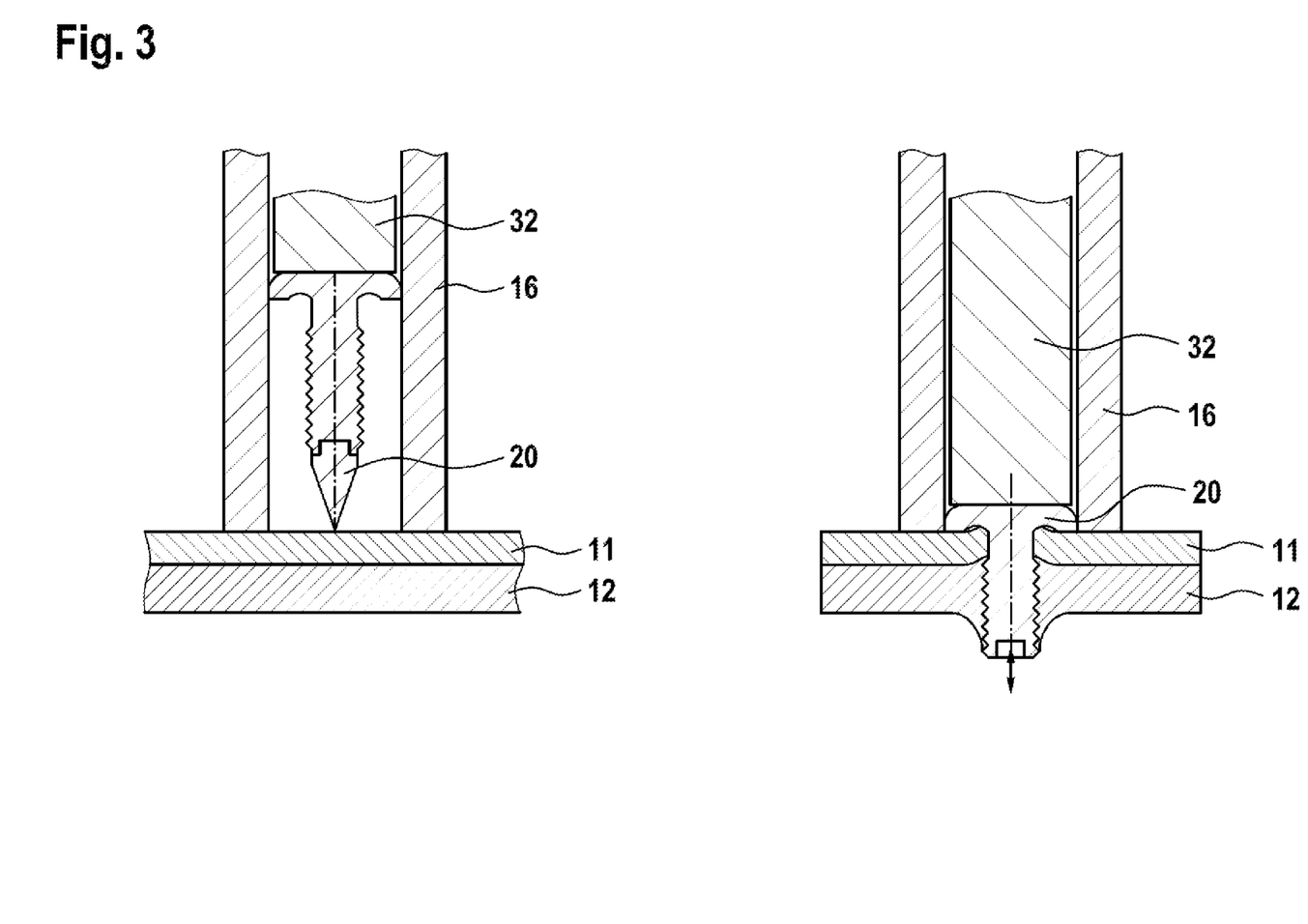
FIG. 3 shows schematically a sequence of a method according to the disclosure, in a preferred embodiment.

Shown schematically in FIG. 3 is a sequence of a method according to the disclosure, in a preferred embodiment. For this purpose, two illustrations each show parts of a device according to the disclosure, as also shown in FIG. 1, and of a setting unit, as also shown in FIG. 2. In particular, the sonotrode 32 and the holder 16, as well as a nail 20, are shown, and also two component parts 11 and 12 that are to be connected.

The first illustration, on the left, shows a situation in which a component part 11,12 is arranged, on which the nail 20 is positioned with its tip but has not yet penetrated. By means of the sonotrode 32, a force is then begun to be applied to the nail 20 in the direction of the component part 11. The vibrations are coupled into the nail 20 as ultrasonic vibrations. The ultrasonic vibrations are generated by the electric vibration generator 92, in particular by an ultrasonic generator. The vibrations are coupled into the nail 20 in a longitudinal direction, such that the pressing-in force is increased in the joining direction. The vibrations are generated at a frequency of between 10 kHz and 100 kHz, preferably between 15 kHz and 50 kHz, depending on the specific nailing technique.

The second illustration, on the right, shows a final position to be reached, in which the nail 20 is pressed into the component parts 11, 12 and the nail shank 21 is anchored in the component parts 11, 12.

Figure 4:
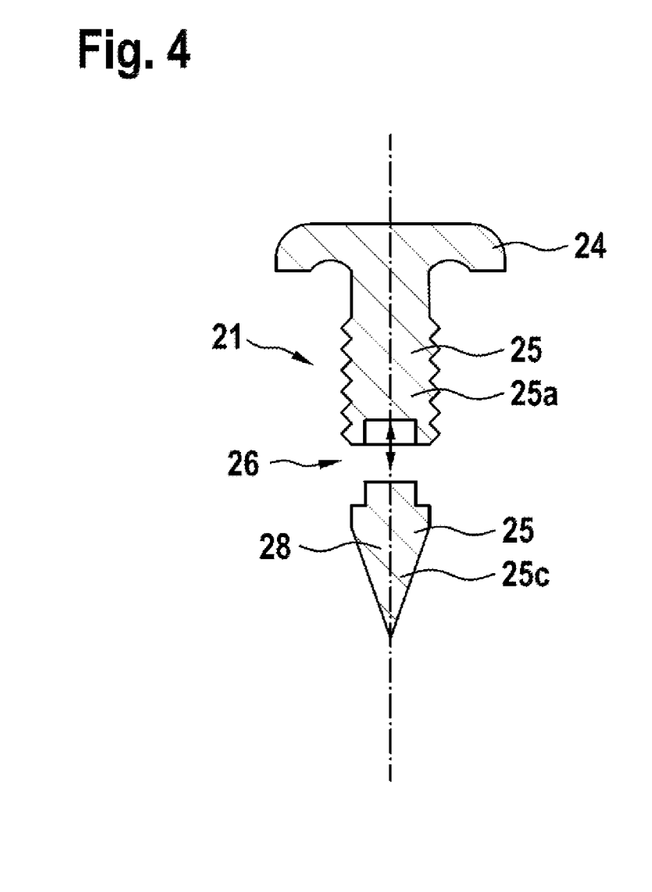
FIG. 4 shows a nail according to the disclosure, in a first preferred embodiment.
Figure 4A:
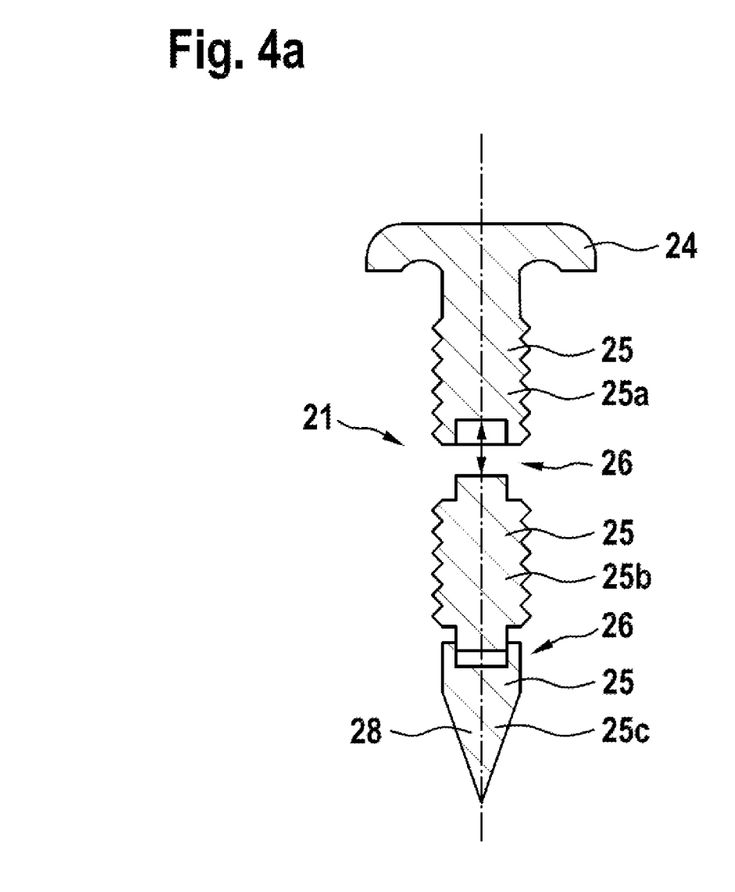
FIG. 4a shows a nail according to the disclosure, in a second preferred embodiment.
Figure 5:
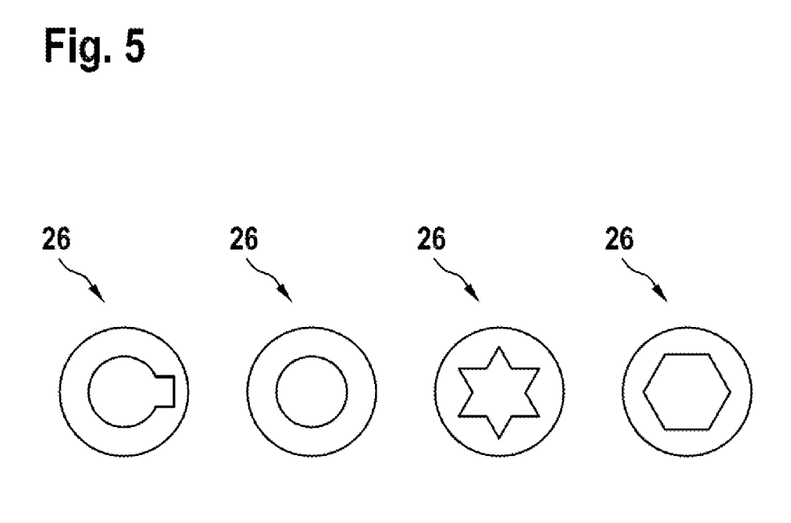
FIG. 5 shows contact geometries of the plug-in connections of the nails according to the disclosure.
Figure 6:
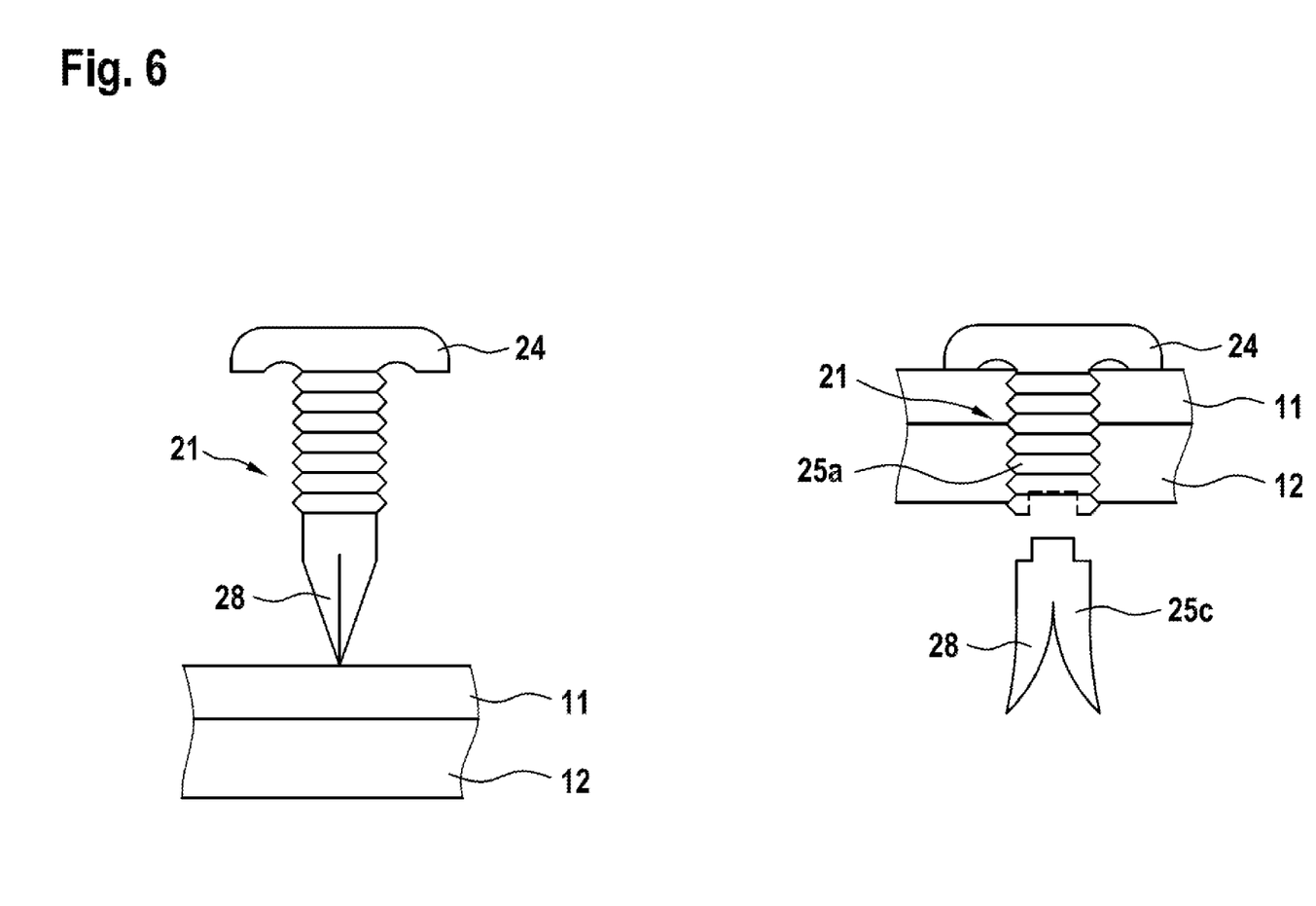
FIG. 6 shows a nail according to the disclosure, in a third preferred embodiment.

FIGS. 4 to 6 show the design of nail 20 in greater detail.

As shown by FIG. 4, the nail 20 has a nail head 24, a nail shank 21 and a nail tip 28. The nail 20 has mutually engaging functional portions 25. The functional portions 25 engage in each other in a separable manner by means of a positive and/or non-positive plug-in connection 26.

In FIG. 4, the nail shank 21 together with nail head 24 forms a functional portion 25a, and another functional portion 25c is formed by the nail tip 28. The functional portion 25a serves as a fastening functional portion. The functional portion 25c is a nail tip. The nail tip functions as a punching tool.

The positive and/or non-positive plug-in connection 26 is designed with a male part, having an outwardly facing contact geometry, and a female part, having an inwardly facing contact opening.

In FIG. 4a, the nail shank 21 has the functional portions 25a, 25b and 25c. The nail shank 21 is lengthened by functional portion 25b. The functional portion 25b serves as a further fastening functional portion. The nail shank 21 can thus be adapted in length to the thickness of the component parts 11,12. The length of the functional portions 25a and 25b depends on the draw-through region of one or more component parts 11,12, or on the thickness of the joint zone of the component parts 11, 12. The functional portions 25a and 25b may differ in length, depending on the application. The functional portions 25a, 25b forming the nail shank 21 are provided with a continuous or at least partial surface structure 22, depending on the thickness of the component part and the component part material.

The positive and/or non-positive plug-in connection 26 is designed with a male part, having an outwardly facing contact geometry, and a female part, having an inwardly facing contact opening.

The contact geometry may be keyhole-shaped, cylindrical, star-shaped or diamond-shaped, as shown in FIG. 5.

The nail 20 is adapted to the required length, according to the application, by means of the functional portions 25a, 25b, 25c that are positively and/or non-positively connected to each other. After the nail 20 has been positioned with the tip 28 on the component part 11,12, a force is begun to be applied to the nail 20 in the direction of the component part 11,12, by means of the sonotrode. The ultrasonic vibrations generated by the ultrasonic generator are coupled into the nail 20 in a longitudinal direction, such that the pressing-in force is increased in the joining direction. During the pressing-in process the nail 20 is pressed into the component parts 11,12. The nail shank 21, consisting of the functional portions 25a and 25c or 25a, 25b, 25c, becomes anchored in the component parts 11, 12. The surface structure 22 increases the holding force. The functional portions 25a, 25b forming the fastening region of the nail shank 21 are in this case connected to each other in a positive and/or non-positive or inseparable manner. The functional portion 25c, 28 forming the punching tool 25c, 28, on the other hand, is separably connected to the functional portion 25a, 25b. Thus, the punching tool 25c, 28 can be separated off following the pressing-in operation. After the punching tool 25c, 28 has been separated off, the nail 20 does not protrude with the tip 25c, 28 over the component-part connection. Depending on the particular application, the punching tool 25c, 28 can be used from different materials. The punching tool 25c, 28 can be reused if it is made of a material that is hard enough for the particular application.

In FIG. 6, the nail tip 28 is slotted on the side away from nail shank. It is provided with at least one slot. The slotting allows the nail tip to spread out following the pressing-in operation. Due to the slotting, the vibration behavior of the nail changes considerably during the course of the process, and in particular when piercing the component parts, due to the free ends, such that this change in the vibration behavior, in the sound emission, can be detected and used for process control. The nail 20 may have functional portions 25 (FIG. 6 right), but may also be made in one piece (FIG. 6 left).

The disclosure additionally provides a component-part arrangement composed of at least 2 component parts 11, 12, which are connected by a nail 20 that has been driven-in by the previously described method.

Due to the surface structure 22 on the nail shank 21, local welding of the nail 20 to component part 11,12 can occur when the nail 20 is pressed in, as a result of the ultrasonic vibration coupled into the nail 20, depending on the process parameters, especially towards the end of the process. This local welding increases the strength of the joint.

Besides the lesser force required and the lesser deformation of the component parts, the proposed method results in a significant noise reduction, in particular owing to the elimination of the previously required massive single pulse with peak sound-pressure levels of up to 180 dB, and owing to the use of ultrasound and the resulting thousands of small multiple pulses, as well as the surface structure of the nail shank.

As already mentioned, the proposed method allows an extended scope of application, e.g. joining of thinner-walled component parts, as well as thicker-walled and/or higher-strength component parts, owing to less distortion of the joined component part flanges (lightweight construction potential), or reduction of the joining force requirement. It also results in cost savings by dispensing with compressed air during the actual joining process, as well as by dispensing with a soundproof enclosure for the complete production cell, which is currently unavoidable in the case of conventional nail setting using the compressed air method with a single impulse.

What is claimed is:

1. A method of inserting a nail into at least one component part, the nail having a nail head, a nail shank and a nail tip, comprising:
    arranging the at least one component part;
    positioning the nail; and
    driving-in the nail including (i) applying a force to the nail in the direction of the at least one component part such that the nail is pressed into the at least one component part, and (ii) coupling vibrations to the nail during the step of applying a force to the nail, wherein:
    the nail is a multipart nail;
    the nail has a plurality of mutually engaging functional portions
    a first of the plurality of mutually engaging functional portions includes a punching tool having a nail tip;
    the punching tool is reusable;
    driving in the nail further comprises driving at least a portion of the punching tool completely through the at least one component part; and
    the method further comprises removing the punching tool from a second of the plurality of mutually engaging functional portions.

2. The method of claim 1, wherein at least one of the plurality of mutually engaging functional portions includes a lengthening functional portion.

3. A method of inserting a nail into at least one component part, the nail having a nail head, a nail shank and a nail tip, comprising:
    arranging the at least one component part;
    positioning the nail; and
    driving-in the nail including (i) applying a force to the nail in the direction of the at least one component part such that the nail is pressed into the at least one component part, and (ii) coupling vibrations to the nail during the step of applying a force to the nail, wherein:
    the nail is a multipart nail;
    the nail has a plurality of mutually engaging functional portions
    a first of the plurality of mutually engaging functional portions includes a punching tool having a nail tip;
    the punching tool possesses a slot defined in a side of the nail tip away from the nail shank so that the slot is positioned away from the nail shank;
    driving-in the nail further comprises driving at least a portion of the slot completely through the at least one component part; and
    the method further comprises spreading the slot after driving at least the portion of the slot completely through the at least one component part.

4. A method of inserting a nail into at least one component part, the nail having a nail head, a nail shank and a nail tip, comprising:
    arranging the at least one component part;
    positioning the nail; and
    driving-in the nail including (i) applying a force to the nail in the direction of the at least one component part such that the nail is pressed into the at least one component part, and (ii) coupling vibrations to the nail during the step of applying a force to the nail, wherein:
    the nail is a multipart nail;
    the nail has a plurality of mutually engaging functional portions;
    at least one of the plurality of mutually engaging functional portions includes a lengthening functional portion; and
    the lengthening functional portion is configured as a nail shank lengthening portion and includes a part of the nail shank.

5. The method of claim 4, wherein the vibrations are generated as ultrasonic vibrations.

6. The method of claim 5, wherein the vibrations are generated by an ultrasonic generator.

7. The method of claim 4, wherein the vibrations are coupled to the nail in a longitudinal direction.

8. The method of claim 4, wherein the vibrations are generated at a frequency of between 10 kHz and 100 kHz.

9. The method of claim 8, wherein the vibrations are generated at a frequency of between 15 kHz and 50 kHz.

10. The method of claim 4, wherein the nail is pressed into the at least one component part by a tool that applies a force to the nail and sets the nail into vibration.

11. The method of claim 4, wherein the plurality of mutually engaging functional portions engage in each other in a separable manner by a positive or non-positive plug-in connection.

12. The method of claim 11, wherein the positive or non-positive plug-in connection includes:
    a male part having an outwardly facing contact geometry, and
    a female part having an inwardly facing contact opening.

13. The method of claim 4, wherein at least one of the plurality of mutually engaging functional portions includes a fastening functional portion.

14. The method of claim 13, wherein the fastening functional portion includes a part of the nail shank.

15. The method of claim 4, wherein a first of the plurality of mutually engaging functional portions includes a punching tool having a nail tip.

16. The method of claim 15, wherein the punching tool is made of a high-strength material so as to facilitate cutting through the component parts.

17. The method of claim 4, wherein:
    the nail shank has a surface structure which anchors itself in the at least one component part when the nail is inserted into the at least one component part; and
    driving-in the nail further comprises driving the surface structure into the at least one component part.

* * * * *